(12) United States Patent
Yoshii

(10) Patent No.: US 12,533,510 B2
(45) Date of Patent: Jan. 27, 2026

(54) ELECTRICAL STIMULATOR

(71) Applicant: SUMIDA CORPORATION, Tokyo (JP)

(72) Inventor: Yoshiharu Yoshii, Natori (JP)

(73) Assignee: SUMIDA CORPORATION (JP)

( * ) Notice: Subject to any disclaimer, the term of this patent is extended or adjusted under 35 U.S.C. 154(b) by 1075 days.

(21) Appl. No.: 16/569,694

(22) Filed: Sep. 13, 2019

(65) Prior Publication Data

US 2020/0108248 A1    Apr. 9, 2020

(30) Foreign Application Priority Data

Oct. 9, 2018 (JP) .................. 2018-191241

(51) Int. Cl.
  *A61N 1/20* (2006.01)
  *A61N 1/22* (2006.01)
  *A61N 1/32* (2006.01)
  *A61N 1/36* (2006.01)

(52) U.S. Cl.
  CPC .............. *A61N 1/205* (2013.01); *A61N 1/22* (2013.01); *A61N 1/326* (2013.01); *A61N 1/36017* (2013.01)

(58) Field of Classification Search
  CPC .......... A61N 1/205; A61N 1/22; A61N 1/326; A61N 1/36017
  See application file for complete search history.

(56) References Cited

U.S. PATENT DOCUMENTS

| | | | | |
|---|---|---|---|---|
| 4,143,661 A * | 3/1979 | LaForge | ............... | A61N 1/3787 623/3.27 |
| 5,014,699 A * | 5/1991 | Pollack | ..................... | A61N 2/00 607/2 |
| 2002/0165583 A1 | 11/2002 | Tepper et al. | | |
| 2005/0288741 A1 * | 12/2005 | Hassler | ................ | A61N 1/3787 607/61 |
| 2011/0043190 A1 * | 2/2011 | Farr | ....................... | H01F 27/289 336/84 R |
| 2013/0211181 A1 | 8/2013 | Schmidt | | |
| 2014/0167740 A1 * | 6/2014 | Gilbert | ................. | G01R 15/181 324/127 |
| 2015/0119632 A1 | 4/2015 | Schmidt | | |
| 2015/0283394 A1 | 10/2015 | Schmidt | | |

(Continued)

FOREIGN PATENT DOCUMENTS

WO    WO-2015-138915 A1    9/2015

OTHER PUBLICATIONS

P N Murgatroyd et al 1991 Meas. Sci. Technol. 2 1218 (Year: 1991).*

(Continued)

*Primary Examiner* — William J Levicky
(74) *Attorney, Agent, or Firm* — Harness, Dickey & Pierce, P.L.C.

(57) ABSTRACT

An electrical stimulator is provided including: a base wire configured with a core wire and an outer winding wire wound around the core wire with the core wire serving as a winding axis. The core wire is entirely coated by an insulating film, and an annulus is formed by spiraling or looping the base wire. One end of the core wire is electrically connected to one end of the outer winding wire. The other end of the core wire is connected to a first terminal of an external circuit. Further, the other end of the outer winding wire is connected to a second terminal of the external circuit. Thus, the annulus can apply an electrical stimulation to a living body.

23 Claims, 7 Drawing Sheets

(56) References Cited

U.S. PATENT DOCUMENTS

| | | | |
|---|---|---|---|
| 2016/0022986 A1 | 1/2016 | Travers et al. | |
| 2016/0300652 A1* | 10/2016 | Daibo | H01F 5/02 |
| 2017/0356935 A1* | 12/2017 | Hurwitz | G01R 19/12 |
| 2018/0169371 A1 | 6/2018 | Dea | |
| 2020/0132730 A1* | 4/2020 | Hashimoto | G01R 15/181 |

OTHER PUBLICATIONS

Extended European Search Report for corresponding Application No. EP 19201534.5 dated Mar. 4, 2020 (5 pages).

\* cited by examiner

ELECTRICAL STIMULATOR

CROSS-REFERENCE TO RELATED APPLICATIONS

This application claims priority to Japanese Patent Application No. 2018-191241 filed Oct. 9, 2018 which is hereby expressly incorporated by reference herein in its entirety.

BACKGROUND

1. Technical Field

The present invention relates to an electrical stimulator that treats or cures, for instance, personal injuries or damage to a human body, such as a bone fracture, a bone disorder, such as osteoporosis, and lumps such as tumors or neoplasms.

2. Related Art

The human body takes a long time to naturally recover or spontaneously heal from bone fractures, osteoporosis, or personal injuries or damage. In particular, methods for treating elderly people, other than diet, exercise, and sunbathing are quite limited. Therefore, a method of achieving a faster treatment or a faster cure without causing pain is desired. Further, a treatment method for cancer (also referred to as "TTF: tumor treating fields") by utilizing a low strength electromagnetic field is known. However, such treatment has a problem in that skin damage can be large because an electrode is adhered to the skin. Therefore, an electrical stimulator that does not burden or damage the skin and that is freely attachable onto and detachable from the skin is also desired.

As a conventional treatment method, Japanese Patent Publication Number 2002-522125 discloses a method in which a PEMF (pulsed electromagnetic field therapy) treatment for a selected body portion of a patient is performed by utilizing a magnetic field that is generated from a flexible coil.

Further, as shown in Japanese Patent Publication Number 2017-507751, a screw type electrode is embedded inside a body and an electric current flows in an affected region through the electrode so as to heal a wound or bone damage. As a result, a speedier recovery can be accomplished.

Further, Japanese Patent Publication Number 2017-522099 shows a method for treating cancer. Specifically, a tumor cell, in particular, a recurrent glioblastoma is targeted and cancer cell division is suppressed by a force in an electric field.

However, with respect to the PEMF treatment shown in Japanese Patent Publication Number 2002-522125, only magnetic stimulation can be applied to an affected part, for instance, a broken bone. As a result, a recovery period becomes longer than desired. Further, with respect to the method shown in Japanese Patent Publication Number 2017-507751, a therapeutic approach is required that inflicts physical pain on the patient such as surgery. As a result, for people having weaker physical strength, for instance, elderly people, a burden is imposed on the body. Further, with respect to the method shown in the Japanese Patent Publication Number 2017-522099, because an array of electrodes is directly attached to the skin of a patient, there is a report that inflammation of the skin or dermatitis occurs in approximately 20% of patients within a couple of weeks after the treatment. Therefore, it is desired to provide an electrical stimulator that does not cause damage to the skin of a patient and that can be easily attached to the patient.

SUMMARY

The present invention attempts to solve the above problems. An object of the present invention is to provide an electrical stimulator that can achieve a shorter treatment time, and cause less burden or less damage to a body of a patient.

In order to achieve the above object, an electrical stimulator according to one aspect of the present invention includes: a base wire configured with a core wire and an outer winding wire, the core wire is partially or entirely coated by an insulating film, the outer winding wire being wound around the core wire, the core wire being a winding axis; and an annular member (annulus) (a spiral, a helix, a tube, a cylindrical member, or a helical member) formed by spiraling or looping the base wire. One end of the core wire is electrically connected to one end of the outer winding wire. The other end of the core wire is connected to a first terminal of an external circuit. Further, the other end of the outer winding wire is connected to a second terminal of the external circuit. The annular member is configured to apply an electrical stimulation to a living body.

In the electrical stimulator according to another aspect of the present invention, the base wire is wound two or more turns to form the annular member so that the annular member is in a spiral shape.

In the electrical stimulator according to another aspect of the present invention, the outer winding wire is wound around the core wire without a clearance. The base wire is wound without a clearance to form the annular member so that two adjacent spirals of the base wire are arranged without a gap therebetween.

In the electrical stimulator according to another aspect of the present invention, at least one of the core wire or the outer winding wire is a litz wire.

The electrical stimulator according to another aspect of the present invention further includes a support that supports the annular member.

In the electrical stimulator according to another aspect of the present invention, the base wire is wound one turn so that the annular member is in a loop shape. Two ends of each of the annular member and the support are detachably connected to each other to form a loop.

In the electrical stimulator according to another aspect of the present invention, the external circuit has a controller that is configured to control a parameter of the electrical stimulator. The parameter is one of an amount of an electric current flowing in the base wire, a period of time for flowing the electric current, or a frequency of the electric current.

The present invention can provide an electrical stimulator that can achieve a shorter treatment time, less burden or less damage on a body of a patient, and an easier attachment onto the patient.

DESCRIPTION OF EXEMPLARY EMBODIMENTS

Figure 1:
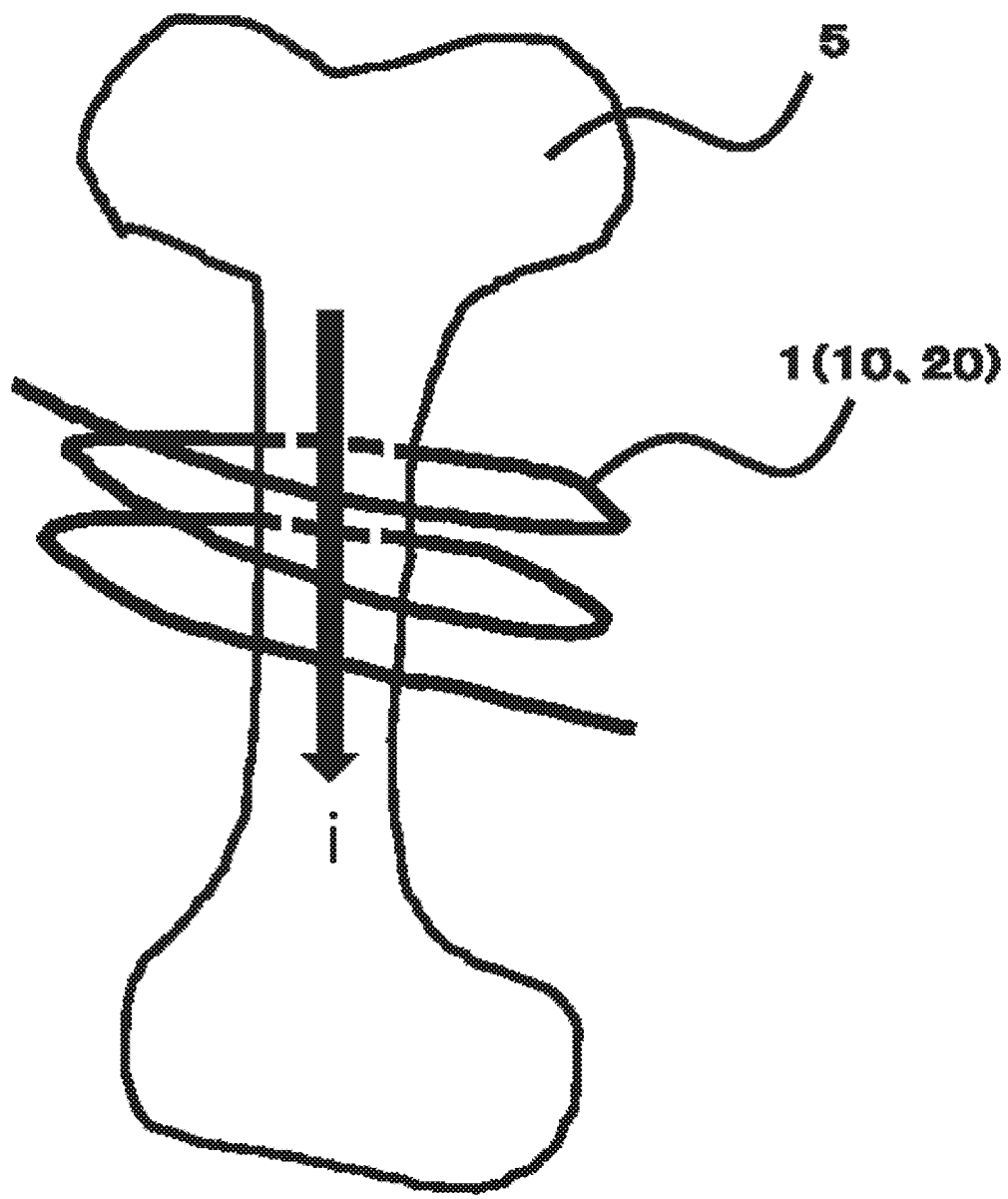
FIG. 1 is a schematic view for explaining an electrical stimulator including a base wire according to first and second embodiments of the present invention.

As discussed below, embodiments according to the present invention are explained with reference to the drawings.

In regards to the drawings, redundant explanations with respect to the same configurations are omitted but the same reference numerals are used for labeling. Further, because the drawings according to the first and second embodiments are for explaining, for instance, the configurations or the functions of the first and second embodiments, an arrangement thereof, a size ratio, a thickness (or a diameter), a length, a width, and a height may not necessarily be shown precisely. Further, the first and second embodiments are not limited to the configurations shown in the drawings. Further, in this specification, the first and second embodiments are also collectively referred to as "present embodiment(s)."

FIG. 1 is a schematic view for explaining an electrical stimulator 1 in which a base wire 10 according to the present embodiment of the present invention is used.

Figure 2:
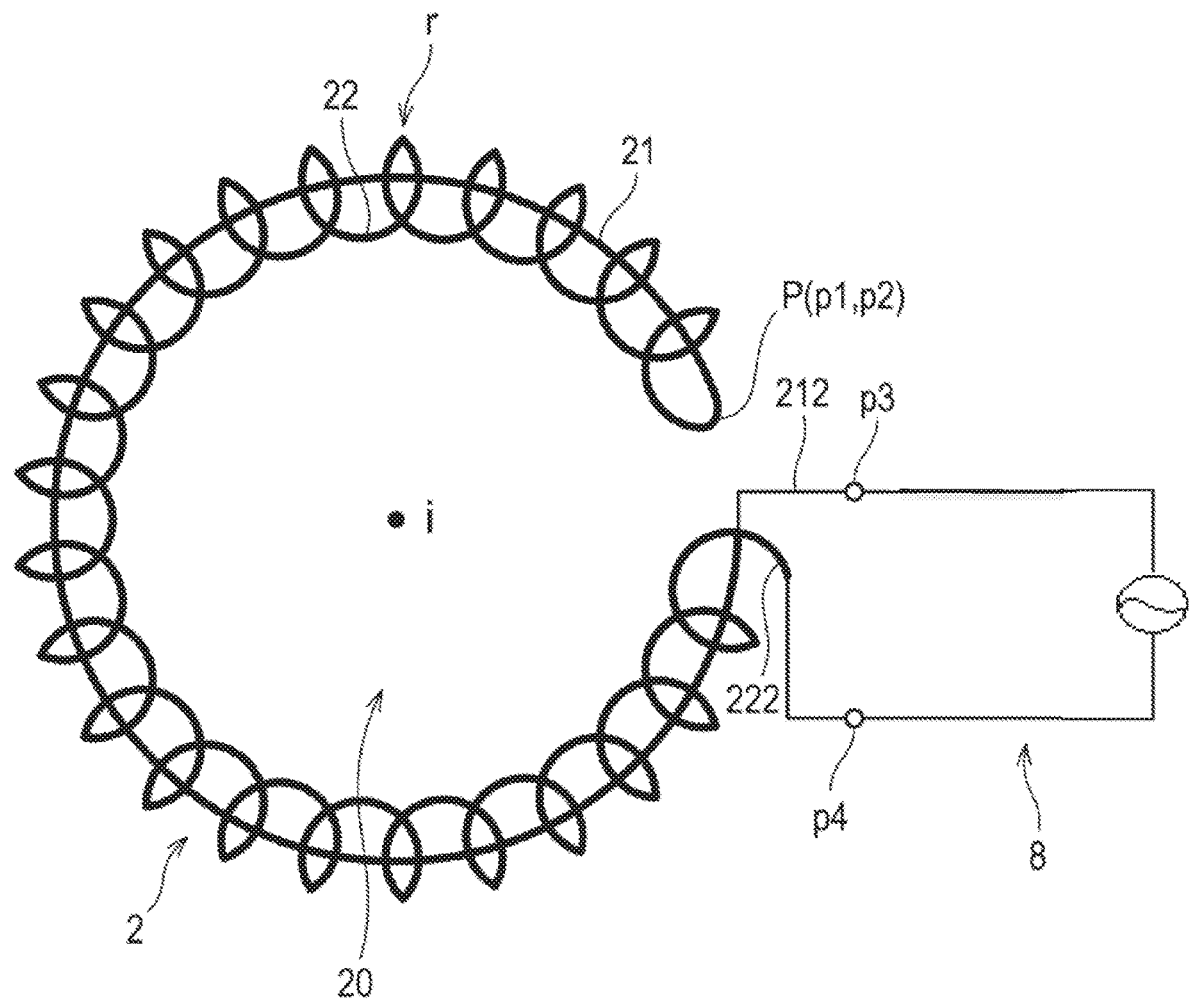
FIG. 2 is a schematic view for explaining an electrical stimulator, in which the base wire shown in FIG. 1 is implemented, according to the embodiments of the present invention.

As explained below, the base wire 10 is configured with a core wire 21 and an outer winding wire (FIG. 2). Specifically, the base wire 10 is formed by spiraling or looping the outer winding wire 22 around the core wire 21. The electrical stimulator 1 shown in FIG. 1 is configured by spiraling or looping the base wire 10 around a bone 5 of a human body. Further, with respect to FIG. 1, human body parts such as muscles, blood vessels, and skin around the bone 5 are not shown.

In addition, because an outer circumferential surface of each of the core wire 21 and the outer winding wire 22 of the base wire 10 (for instance, FIG. 2) is coated with either a first insulating film 221 or a second insulating film 211, respectively (for instance, FIGS. 3A and 3B, 4A, 5, and 6A), the base wire 10 and the bone 5 or the human body part are insulated from each other.

In the present embodiment, with respect to the electrical stimulator 1 shown in FIG. 1, the bone 5 is a current flow path through which a current "I" that is generated by the electrical stimulator 1 flows. Thus, an induced current "i" flows in the bone 5.

The base wire 10 is wound around the bone 5 in a circumferential direction thereof while the base wire 10 is shifted in a longitudinal direction of the bone 5 by approximately a thickness (diameter) of the base wire 10. In the present embodiment, the winding method explained above is referred to as a spiral (helical) winding.

In the present embodiment, the base wire 10 is configured with the core wire 21 and the outer winding wire 22. A first lead (extension) wire 212 is physically and electrically connected to the core wire 21 and a second lead (extension) wire 222 is physically and electrically connected to the outer winding wire 22. The first extension wire 212 and the second extension wire 222 are lead wires (conducting wires) so that the core wire 21 and the outer winding wire 22 are electrically connected to an external circuit 8 shown in FIG. 2.

The base wire 10 and the electrical stimulator 1 in which the base wire 10 is utilized according to the present embodiment of the present invention will be explained below.

First Embodiment

Base Wire

First of all, an electric characteristic of the base wire 10 according to the first embodiment will be explained with reference to the drawings below.

FIG. 2 is a schematic view for explaining an electrical stimulator 1 to which the base wire 10 shown in FIG. 1 is applied. As shown in FIG. 2, the base wire is configured with the core wire 21 and the outer winding wire 22 that is spirally wound around the core wire 21. The core wire 21 and the outer winding wire 22 are different lead wires. One end "p1" and one end "p2" of the core wire 21 and the outer winding wire 22, respectively, are connected at a point "P". Further, the other end "p3" of the core wire 21 and the other end "p4" of the outer winding wire 22 correspond to ends of the first extension wire 212 and the second extension wire 222, respectively, that are connected to the external circuit 8, for instance, as shown in FIG. 2. Specifically, the other end "p3" is located at a different side of the core wire 21 with respect to one end "p1." The other end "p4" is located at a different side of the outer winding wire 22 with respect to one end "p2." The external circuit is for sending an electric signal (for instance, an electric current) that is input to the core wire 21 and the outer winding wire 22. Thus, the external circuit 8 explained above works as a power supply that supplies an electric current to the base wire 10 of the electric stimulator 1. The electrical stimulator 1 forms an electric field inside of an annular member (an annulus, a spiral, a helix, a tube, a cylindrical member, or a helical member) 20. Technically, the annulus 20 or annular member 20 is formed by one turn of the base wire 10 because it is loop-shaped or ring-shaped. On the other hands, a spiral 20 or a helical member 20 is formed by two or more turns of the base wire 10 because a plurality of turns are spiral-shaped or helical-shaped, similar to a shape of a coil spring. However, unless otherwise specified, in this application, the term "annulus" can include an annulus, an annular member, a tube, a cylinder or a cylindrical member, a spiral, a helix, and a helical member. Specifically, the annular member 20 is configured by spiraling or looping the base wire 10. Thus, the annular member 20 corresponds to a shape, a configuration, or a structure of the wound base wire 10. Further, the core wire 21 and the outer winding wire 22 are not limited to individual lead wires. It is also possible that the core wire 21 and the outer winding wire 22 may be formed by a single lead wire that is folded back at the point "P."

Figure 3A:
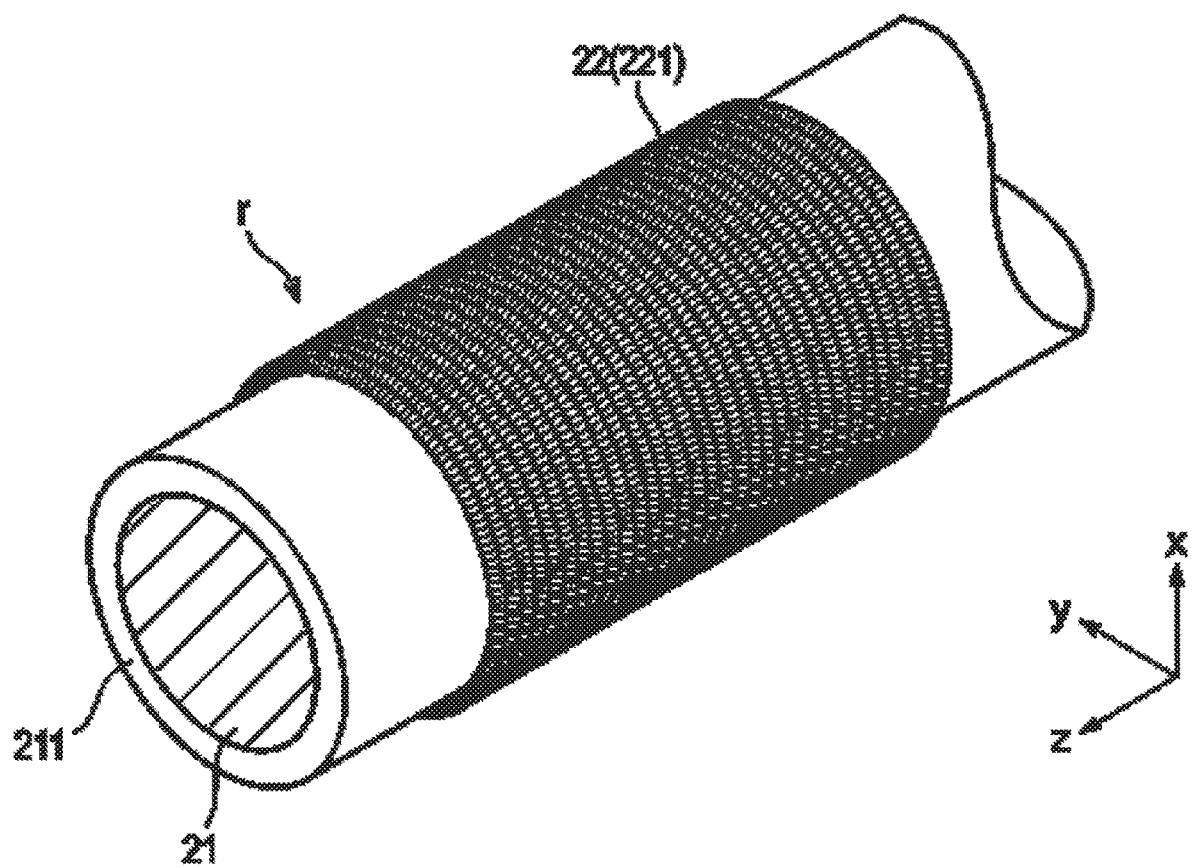
FIG. 3A is a schematic perspective view for showing a part of the base wire according to the embodiments of the present invention.
Figure 3B:
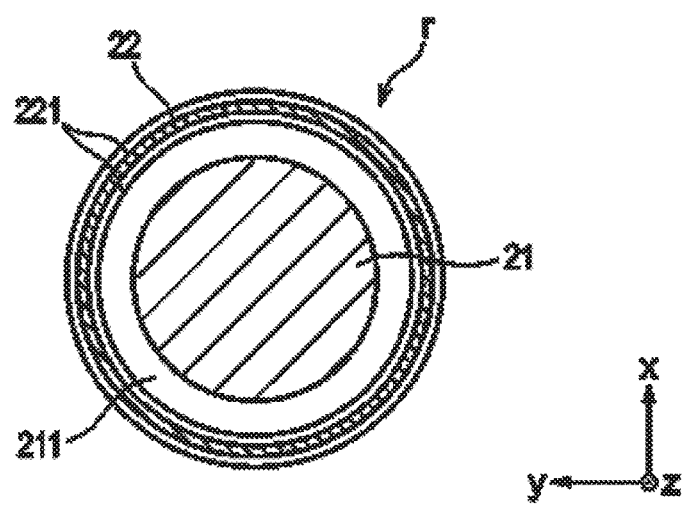
FIG. 3B is a cross-sectional view of the base wire according to the embodiments of the present invention when the base wire is cut along an X-Z plane when viewed in the Z-direction in an X, Y, and Z coordinate system shown in FIGS. 3A and 3B.
Figure 4A:
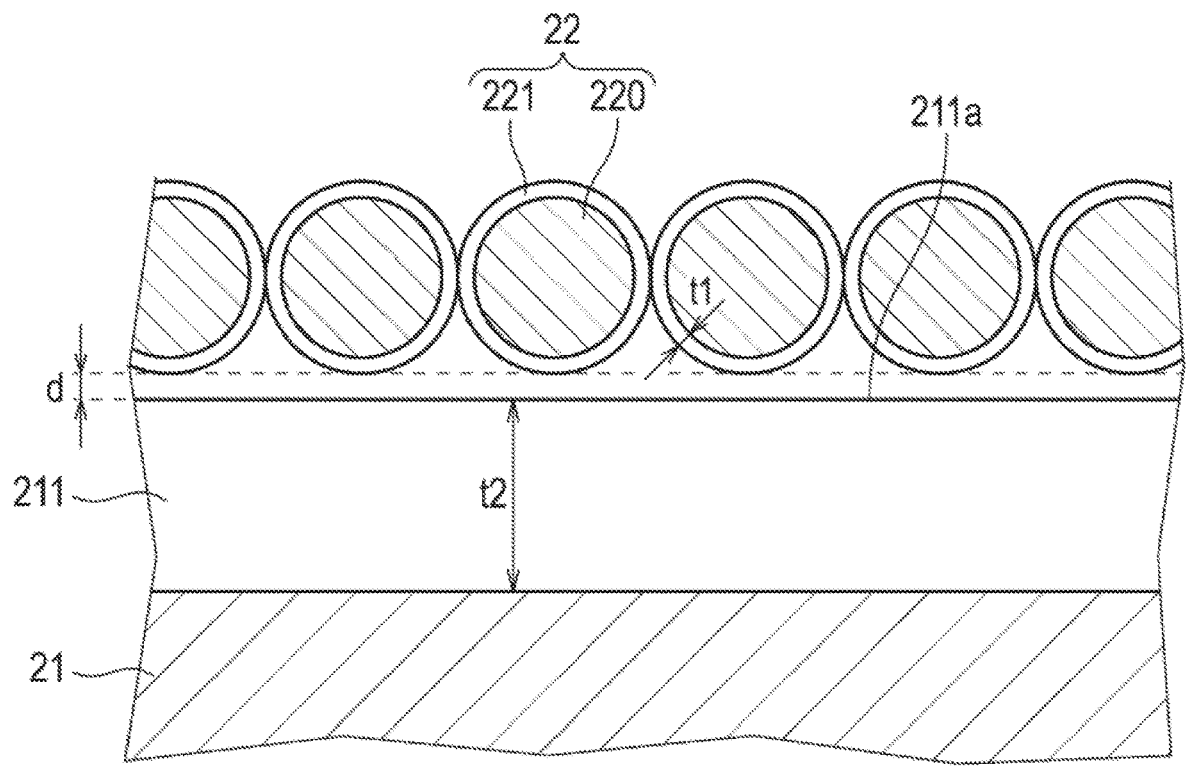
FIG. 4A is a diagram that shows a state in which an outer winding wire is wound around a core wire while the outer winding wire is spaced apart from the base wire by a predetermined distance "d" and at the same time, in which the core wire has (is coated by) a second insulating film according to the embodiments of the present invention.
Figure 4B:
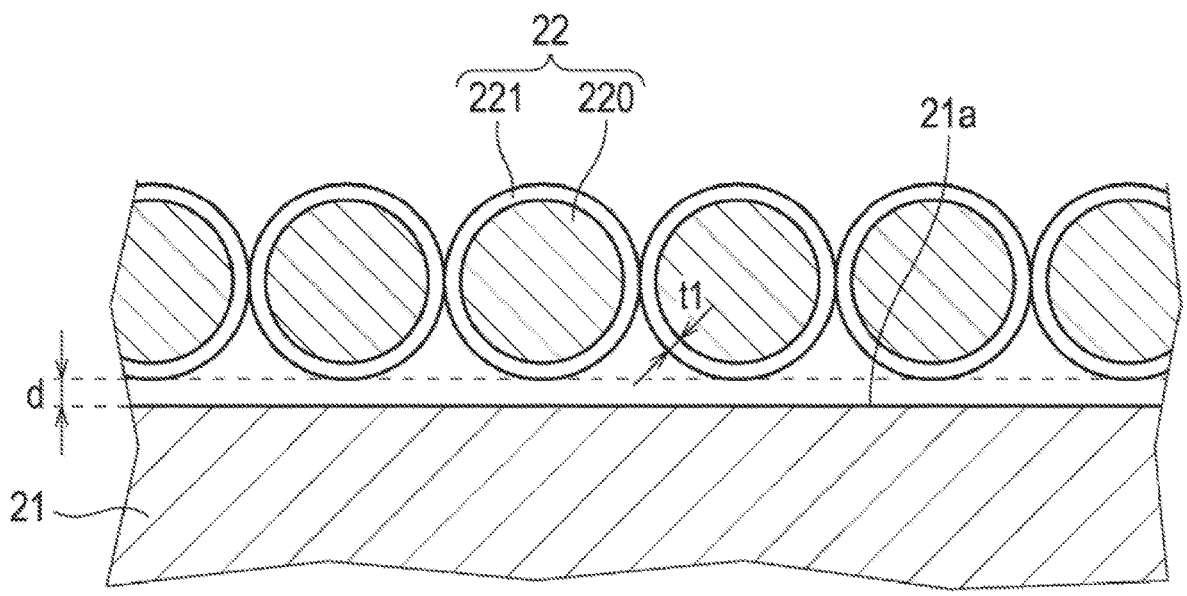
FIG. 4B is a diagram that shows a state in which the outer winding wire is wound around the core wire while the outer winding wire is spaced apart from the core wire by a predetermined distance "d" and at the same time, in which the core wire is exposed without being coated by the second insulating film according to the embodiments of the present invention.
Figure 5:
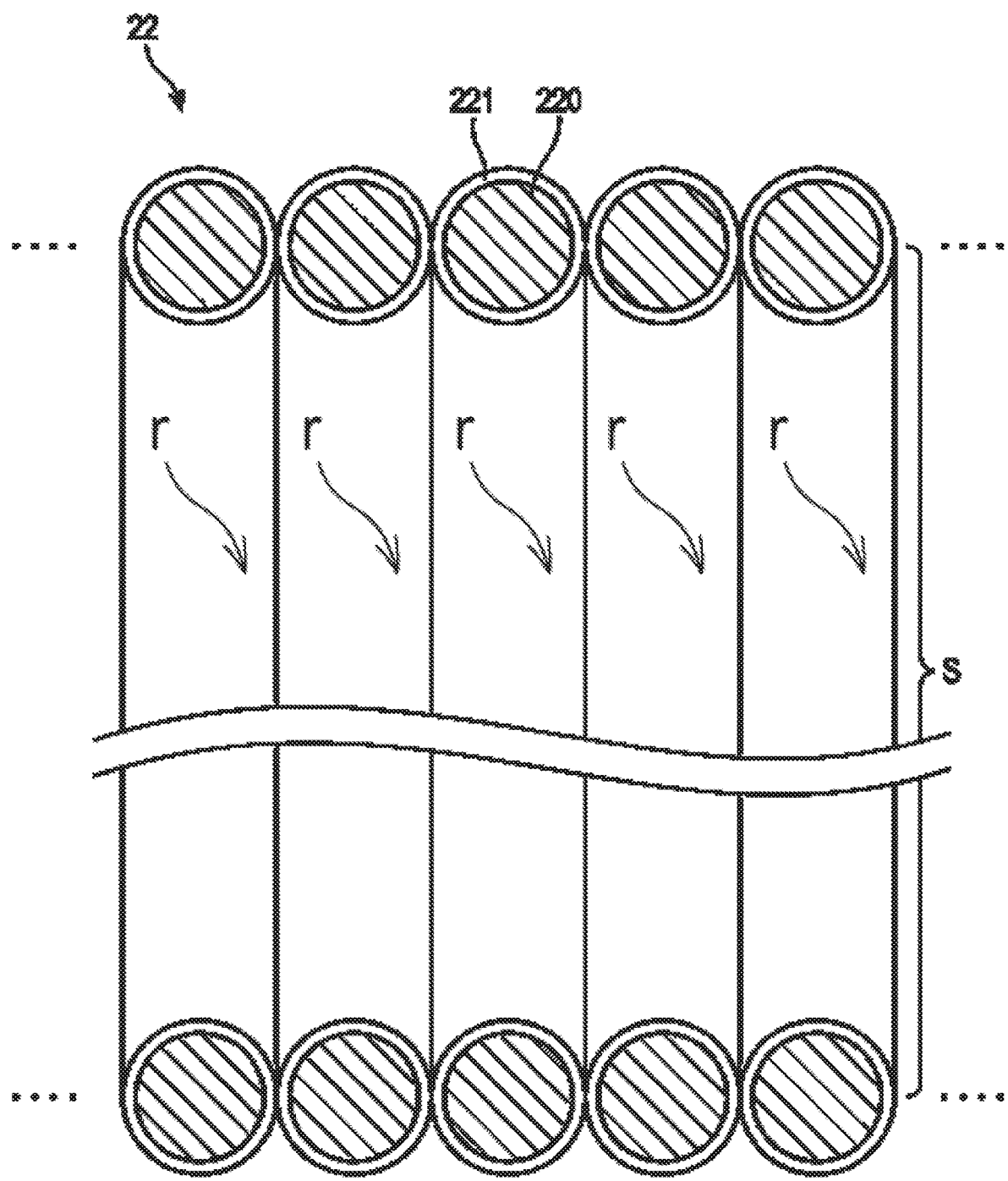
FIG. 5 is a diagram that shows a loop(s) (a spiral or spirals) "r" that is formed by spiraling or looping the outer winding wire shown in FIGS. 4A and 4B according to the embodiments of the present invention.

FIGS. 3A, 3B, 4A, 4B, and 5 are diagrams for explaining the shape or structure of the base wire 10 shown in FIG. 1. FIG. 3A is a schematic perspective view for showing a part of the base wire 10. FIG. 3B is a cross-sectional view of the base wire 10 when the base wire 10 is cut along an X-Y plane and when viewed in the Z-direction in an X, Y, and Z coordinate system shown in FIGS. 3A and 3B. FIGS. 4A, 4B, and 5 are cross-sectional views of the base wire 10 when the base wire 10 is cut along an X-Z plane and when viewed in the Y-direction in the X, Y, and Z coordinate system shown in FIGS. 3A and 3B. Both FIGS. 4A and 4B show a state in which the outer winding wire 22 is wound around the core wire 21 while the outer winding wire 22 is spaced apart from the core wire 21 by a predetermined distance "d." FIG. 4A shows an example in which the core wire 21 has (is coated by) a second insulating film 211. FIG. 4B shows an example in which the outer winding wire 22 is exposed without being coated by the second insulating film 211. FIG. 5 shows a plurality of spirals "r" (five spirals) that are formed by spirally winding the outer winding wire 22 and by omitting the core wire 21 shown in FIGS. 4A and 4B. All of FIGS. 3A, 3B, 4A, 4B, and 5 are schematic views.

As shown in FIGS. 3A and 3B, the base wire 10 according to the first embodiment has the core wire 21 and the outer winding wire 22. Specifically, the core wire 21 has flexibility and conductivity. The outer winding wire 22 is configured with a conductive wire 220 and the first insulating film 221 that is entirely coated on the conductive wire 220. One end "p1" of the core wire (FIG. 2) and one end "p2" of the outer winding wire 22 (FIG. 2) are electrically connected to each other. At the same time, since the outer winding wire 22 is wound around the core wire 21, a plurality of spirals "r" in which the core wire 21 corresponds to a common central axis are formed.

With respect to the flexibility that is desired for the core wire 21, it may be sufficient for the annular member 20 to be formed by deforming the core wire 21 into an annular shape. A diameter of the annular member 20 is determined depending on the uses and applications of the electrical stimulator 1 that is configured by using the base wire 10. As the diameter of the annular member 20 that is formed by the core wire 21 decreases, the flexibility that is desired for the core wire 21 increases. The outer winding wire 22 is configured with the conductive wire 220 and the first insulating film 221, which is formed so as to entirely coat the conductive wire 220 (being coated and formed).

The core wire 21 and the conductive wire 220 can be, for instance, soft copper wires (annealed copper wires) (a cross section is in a circular shape) in which a diameter is 0.025 mm-3.2 mm. Further, the first insulating film 221 can be, for instance, an insulation film having a thickness of approximately 0.003 mm-0.035 mm of a varnish that is obtained by melting a high molecular compound (a polymeric compound). As the polymeric compound for the first insulating film 221, materials such as polyvinyl formal, polyurethane, polyamide imide, polyester, and nylon can be used.

Further, the second insulating film 211 can also be an insulation film having a thickness of approximately 0.003 mm-0.1 mm of a varnish that is obtained by melting the high molecular compound (the polymeric compound). As the polymeric compound for the second insulating film 211, materials such as polyvinyl formal, polyurethane, polyamide imide, polyester, and nylon can also be used.

Further, with respect to the first embodiment, the cross sections of the core wire 21 and the conductive wire 220 are not limited to the circular shape. The cross sections of the core wire 21 and the conductive wire 220 may also be an elliptical (oval) shape, a rectangular shape, or a polygonal shape.

Further, the core wire 21 and the outer winding wire 22 (and/or the conductive wire 220) can also be the same wire. In other words, the materials or sizes thereof can be all the same. Further, a part of the specifications or material properties of these wires may be different from each other. In addition, at least one of the core wire 21 and the outer winding wire 22 (and/or the conductive wire 220) can also be a single wire or a litz wire that is composed by twisting a plurality of wires together.

According to the first embodiment, the core wire and the conductive wire 220 are insulated from each other. Thus, so long as they are insulated from each other, the core wire 21 may be coated with an insulating film (FIG. 4A) or may not be coated with an insulating film (FIG. 4B). FIG. 4A shows a state in which the core wire 21 is coated with the second insulating film 211.

When the second insulating film 211 is formed on the surface of the core wire 21, as shown in FIG. 4A, the shortest distance "d" between an inner circumferential surface "S" (FIG. 5) of at least a part of the plurality of spirals "r" of the outer winding wire 22 and a surface 211a of the second insulating film 211 is smaller than the thicker one of a thickness t1 of the first insulating film 221 and a thickness t2 of the second insulating film 211. That is, with reference to the examples of the numerical values (in a range of approximately 0.003 mm to 0.035 mm) of the insulating films explained above, the shortest distance "d" can be any numerical value that is 0.003 mm or less or that is 0.035 mm or less. In the example shown in FIG. 4A, with respect to the thicknesses t1 and t2, it is clear that the thickness t2 (the second insulating film 211) is sufficiently larger than the thickness t1 (the first insulating film 221). Therefore, it is clear that the shortest distance "d" is smaller than the thickness t2 (the second insulating film 211—the thicker one) as shown in FIG. 4A.

As shown in FIG. 5, with respect to the circumferential surface of the outer winding wire 22, the inner circumferential surface "S" of the outer winding wire 22 faces toward the core wire 21. Therefore, the inner circumferential surface "S" is defined as the surface that can come in contact with the core wire 21 directly or come in contact with the core wire 21 indirectly via the second insulating film 211.

Further, "at least a part of the plurality of spirals 'r'" means (includes) a part or all of the plurality of spirals "r." In other words, it is excluded from such term (at least a part of the plurality of spirals "r") if with respect to all of the plurality of spirals "r," any and every distances between the inner circumferential surfaces "S" and the surface 211a are equal to or more than the shortest distance "d." Further, the shortest distance means the distance between the surface 211a and the point on the inner circumferential surface "S" that is the closest from the surface 211a among various points on the inner circumferential surface "S" of the plurality of spirals "r." Therefore, with respect to the configurations according to the first embodiment, a case is not excluded in which there is the point on the inner circumferential surface "S" in which the distance between such point and the surface 211a is equal to or more than the shortest distance "d."

However, with respect to the first embodiment, when the second insulating film 211 is formed on the surface of the core wire 21, it is preferred that an entirety of the inner circumferential surfaces "S" of at least a part of the plurality of spirals "r" of the outer winding wire 22 come in contact with the surface 211a of the second insulating film 211.

Further, with respect to the first embodiment, as shown in FIG. 4B, when the surface of the core wire 21 is exposed, the shortest distance "d" between the inner circumferential surface S of at least a part of the plurality of spirals "r" of the outer winding wire 22 and the surface 21a of the core wire 21 is smaller than the thickness t1 of the first insulating film 221. Note that although the illustration shown in FIG. 4B may not correspond to the above feature for the purpose of easy visible illustration, the first embodiment with respect to FIG. 4B is directed to a relationship of "d<t1." Here, the shortest distance means the distance between the surface 21a and the point on the inner circumferential surface "S" that is the closest from the surface 21a among various points on the inner circumferential surface "S" of the plurality of spirals "r." With respect to the first embodiment, when the surface 21a of the core wire is exposed, it is preferred that an entirety of the inner circumferential surfaces "S" of at least a part of the plurality of spirals "r" of the outer winding wire 22 come in contact with the surface 21a of the core wire 21.

Figure 6A:
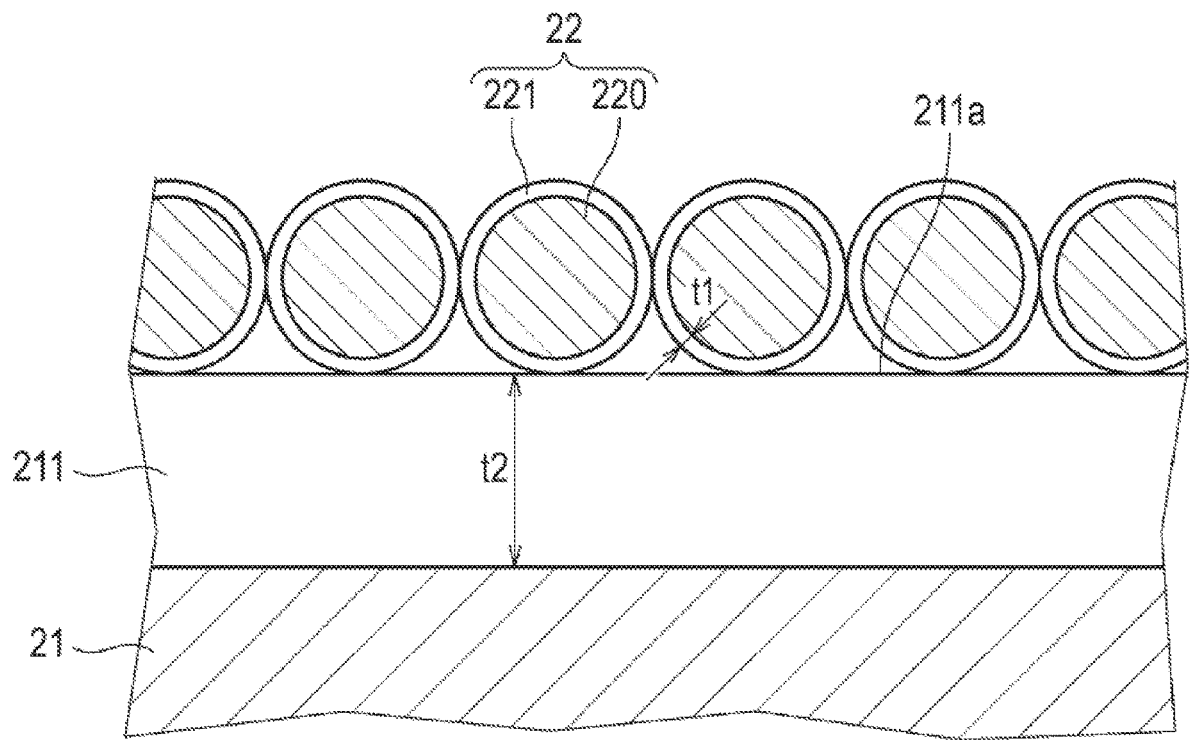
FIG. 6A is a diagram that shows a state in which the outer winding wire is wound around the core wire while the outer winding wire comes in contact with the core wire, and at the same time, in which the core wire has the second insulating film according to the embodiments of the present invention.
Figure 6B:
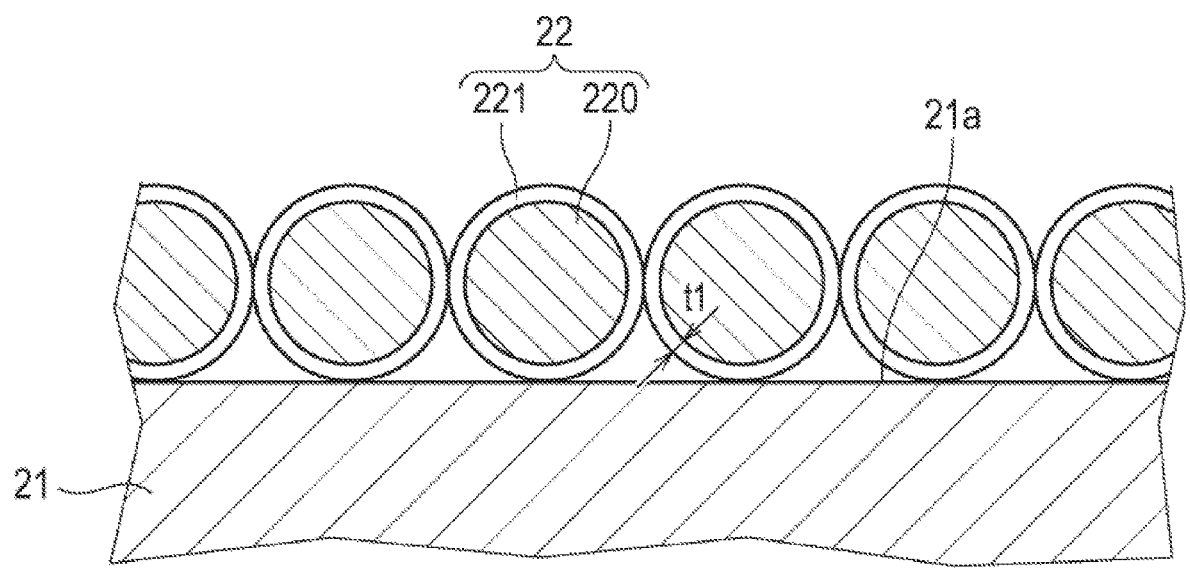
FIG. 6B is a diagram that shows a state in which the outer winding wire is wound around the core wire while the outer winding wire comes in contact with the core wire, and at the same time, in which the core wire is exposed without coating of the second insulating film according to the embodiments of the present invention.

Further, with respect to the first embodiment, under the conditions and features explained above, the numerical value of the distance between the inner circumferential surface "S" and the surface 211a of the second insulating film 211 or the surface 21a of the core wire 21 can be "0 (zero)," i.e., the inner circumferential surface "S" and the surface 211a or surface 21a may come in contact with each other as shown in FIGS. 6A and 6B. Both of FIGS. 6A and 6B show a state in which the outer winding wire 22 is wound around the core wire 21 while the outer winding wire 22 comes in contact with the core wire 21. Specifically, FIG. 6A shows the example in which the core wire 21 has the second insulating film 211. FIG. 6B shows the example in which the outer winding wire 22 is exposed without coating of the second insulating film 211. In these examples in which the outer winding wire 22 comes in contact with the core wire 21, at least a part of the inner circumferential surface S of at least a part of the plurality of spirals "r" of the outer winding wire 22 comes in contact with the surface 211a of the second insulating film 211 or the surface 21a of the core wire 21.

As explained above, according to the first embodiment, the outer winding wire 22 and the core wire 21 are directly adjacent to (next to) each other with a short distance therebetween or come in contact with each other. As a result, increasing of the resistance of the conductive wire 220 can be suppressed while the sensitivity of the electrical stimulator 1 is enhanced by increasing the number of turns of the outer winding wire 22 per unit length. Further, the parasitic capacitance between the outer winding wire 22 and the core wire 21 can be adjusted by the film thicknesses of the first insulating film 221 and the second insulating film 211, and in addition by the dielectric constants (permittivities) of the first insulating film 221, the second insulating film 211, and the conductive wire 220. The materials of the first insulating film 221 and the second insulating film 211 may be the same or may also be different. Further, the film thickness may also be adjusted according to the parasitic capacitance.

Further, the shortest distance "d" that is defined and explained above corresponds to the numerical value that is generated when the outer winding wire 22 is wound around the core wire 21 or the second insulating film 211 so as to come in contact with the core wire 21 or the second insulating film 211, and thereafter, is reverted by a slight spring back, for example. Further, when the shortest distance "d" is "0 (zero)," it can be considered that the outer winding wire 22 being wound maintains the state as it is by a heat treatment, for example. With respect to the base wire 10 according to the first embodiment explained above, the dispersion of the distances between the outer winding wire 22 and the core wire 21 or the second insulating film 211 at the winding process of the outer winding wire 22 is small. As a result, when the base wire 10 is utilized for an electrical stimulator, it is efficient to decrease the product dispersion of the electrical stimulators.

Further, the base wire 10 according to the first embodiment can be formed so as to have an arbitrary length. Therefore, the base wire 10 can be utilized by being wound around an arbitrary portion. As a result, the base wire can be utilized by being directly wound around the arbitrary portion of a measurement target in which a measured electric current (an electric current that is measured) flows.

Further, as shown in FIGS. 4A-6B, with respect to the base wire 10 according to the first embodiment, the outer winding wire 22 (the conductive wire 220) that forms one of the plurality of spirals "r" comes in contact with the adjacent outer winding wire 22 (the conductive wire 220) that forms another of the plurality of spirals "r" at least a partial area (range) of the plurality of spirals "r." That is, according to the first embodiment, each of the plurality of spirals "r" is formed so as to adhere to an adjacent spiral "r" of the plurality of spirals "r." The term "adhere" (adherence) means a state in which, when a force is applied to the plurality of spirals "r" in the compressing direction of an array of the spirals "r," each of the plurality of spirals "r" comes in contact to another spiral and in which, when the force is released, each of the plurality of spirals "r" experiences a force in the separating direction that is configured to separate the plurality of spirals "r" from each other.

The phrase "at least a partial area (range)" means a partial area or an entire area in which the plurality of spirals "r" are arranged. That is, with respect to the first embodiment, a case is not excluded in which in a part of the plurality of spirals "r," adjacent two spirals "r" do not contact each other.

According to the configuration of the first embodiment explained above, the number of turns of the outer winding wire 22 per unit length can be increased while the length of the conductive wire 220 is minimized. Further, the outer winding wire 22 may be formed by a single wire. However, the present embodiment is not limited to the above feature. Specifically, the outer winding wire may also be a plurality of lead wires that are wound around the core wire 21 together without any space (a clearance) therebetween so that the plurality of outer winding wires are parallel to each other.

Electrical Stimulator

The electrical stimulator 1 that includes the base wire 10 according to the present embodiment of the present invention will be explained below.

As shown in FIG. 2, the electrical stimulator 1 has the base wire 10. The base wire 10 is configured with the core wire 21 and the outer winding wire 22. Specifically, the core wire 21 has (is coated by) the second insulating film 211 thereon. The outer winding wire 22 is wound around the core wire 21 without any space (a clearance) therebetween when the core wire 21 is a winding axis. In addition, the electrical stimulator 1 has the annular member 20 that is formed by spiraling or looping the base wire 10 in a spiral shape. One end "p1" of the core wire 21 is electrically connected to one end "p2" of the outer winding wire 22. The other end "p3" of the core wire 21 is connected to one end (terminal) of the external circuit 8 and the other end "p4" of the outer winding wire 22 is connected to the other end (terminal) of the external circuit 8. As a result, in the electrical stimulator 1, an electrical stimulation, which is generated by the current flowing in the wound base wire 10, can be applied to a living body (part of the living body) that is placed inside the annular member (annulus/spiral/tube/cylindrical member/helical member) formed by the wound base wire 10 so that the induced current "i" as the electrical stimulation flows in the living body (part of the living body).

Specifically, with respect to the electrical stimulator 1, the ends "p1" and "p2" of the core wire 21 and the outer winding wire 22 are connected to each other and the other ends "p3" and "p4" thereof are respectively connected to the first extension wire 212 and the second extension wire 222. Further, the external circuit 8 is connected to the core wire 21 and the outer winding wire 22. The external circuit 8 works as the power supply that applies an electric signal (a current) to the first extension wire 212 and the second extension wire 222.

In addition, the annular member 20 is formed since the base wire 10 is wound one or more turns. When the base wire 10 is wound two or more turns, it is preferred that adjacent pairs of spirals of the base wire for forming the annular member 20 are aligned without any space or clearance from each other on the outer circumferential surface of the base wire 10.

In addition, it is preferred that the electrical stimulator 1 according to the first embodiment has a support member 30 made of resin. In this case, the base wire 10 is wound around an outer circumferential surface of the support member 30 so that the annular member 20 is formed thereon. In other words, because the support member 30 supports the annular member 20, the annular member easily maintains its shape, configuration, or arrangement. Further, the electrical stimulator 1 explained above is attached to a predetermined part, for instance, an arm, a thigh, a leg, or a head of a patient or a living body and a current with a predetermined frequency is applied to the base wire 10 from the external circuit 8. As a result, an electric field is generated inside the annular member 20 along the axial direction of the annular member 20. Further, the induced current "i" flows from a strong electric field toward a weak electric field within the electric field in the predetermined part such as the bone 5 of the patient or the living body. As a result, it becomes possible that the predetermined electrical stimulation is applied to the predetermined human body part such as the bone 5 as a pinpoint treatment.

Further, with respect to the cause of the ailment, such as the osteoporosis, because a bone resorption occurs at a surface side, an inner surface side, or an inside of a cortical bone, a bone cell that exists in the cortical bone dissolves the surrounding bone material. As a result, a volume of a small cavity (in the bone) in which the bone cells exist is increased. The electrical stimulation by the electrical stimulator 1 can suppress the bone resorption from the surface of the cortical bone that is caused by immobilization. Specifically, the immobilization means that a state in which elderly persons and sick persons are in a bedridden condition for a long period of time. When a person is in a bedridden condition for a long period of time, the bone cortexes, which are made by osteoblasts and located at the bone surface, decrease. In other words, it appears that the bone cortexes absorb the bone. As a result of applying the electrical stimulation, the progress of the osteoporosis and other damage or injuries of the living body can be suppressed.

In addition, with respect to the electrical stimulator 1, the employed frequency can be in a range between a few Hz and a few kHz according to the individual or the condition of the damage or injuries. Further, the electrical stimulator 1 may apply a continuous alternating current or a pulsed current to the predetermined human body part.

Further, the external circuit 8 can also provide the same current or different currents at the same time for not only a single annular member 20 that is attached to the single affected part of a single patient but also a plurality of annular members 20 that are attached to a plurality of affected parts of the single patient or a plurality of patients. Since the miniaturization of the external circuit 8 can be achieved, the external circuit can also be a module or a device that is driven by a battery. As a result, the portability of the electrical stimulator 1 increases.

It is preferred that the external circuit 8 has a control unit, a controller, or a CPU including a processor that executes computer-readable instructions stored in a memory to perform the above described operations. Specifically, the control unit can control the parameters, such as an amount of an electric current flowing in the base wire 10 (the core wire 21, and the outer winding wire 22 of the annular member 20), a period of time for flowing the electric current, or a frequency of the electric current. In addition, it is further preferred that the control unit also has other functions. Specifically, the control unit can control the plurality of annular members 20 at the same time and can modify the parameters such as the electric current and/or the frequency based on the data that is fed back from other sensors such as a body temperature sensor and/or a bioelectric current sensor that can also be attached to the patients.

Figure 7:
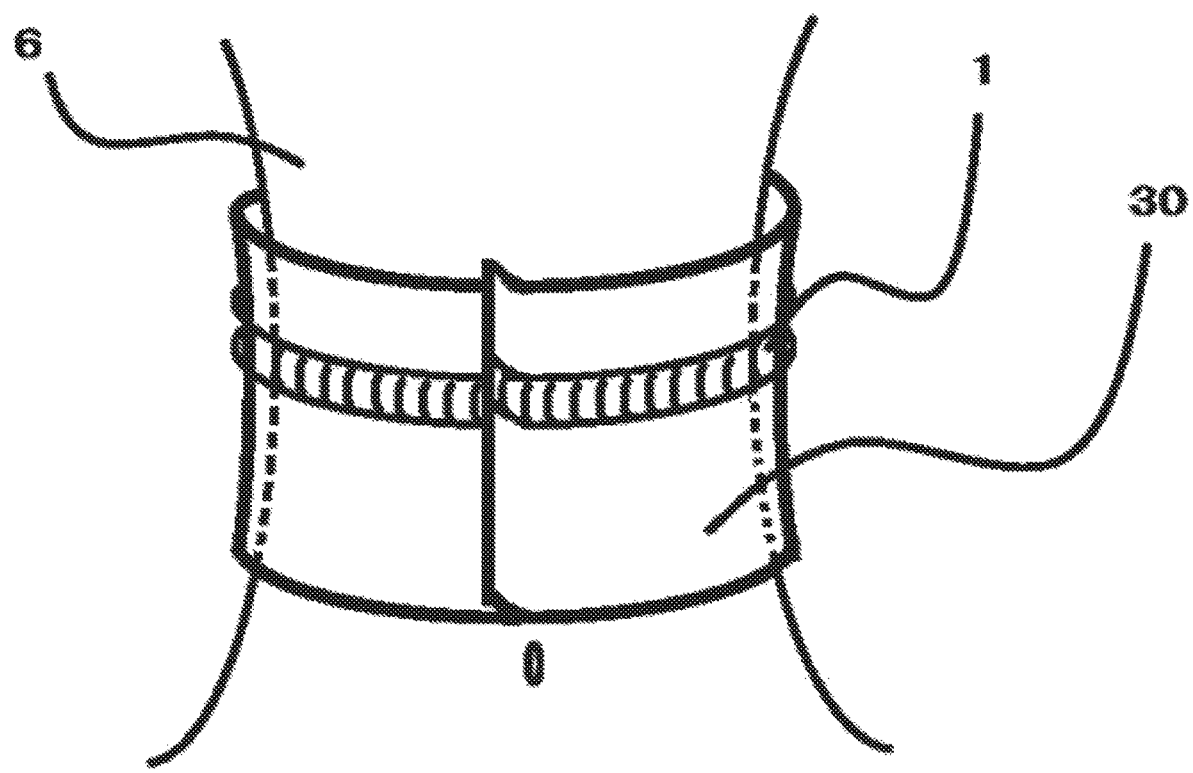
FIG. 7 is a schematic view of the electrical stimulator with a support member when the electrical stimulator having the support member is attached to a living body.

FIG. 7 is a schematic view of the electrical stimulator 1 when the electrical stimulator 1 that has the support member 30 is attached to the living body. As shown in FIG. 7, the electrical stimulator 1 in which the base wire 10 is wound around the outer circumferential surface of the support member 30 can be wrapped around a torso 6 of the human body.

Further, as shown in FIG. 7, it is preferred that the support member 30 can be opened and closed (detachably attached), and at the same time, has attachment members on the both edges of the support member 30 that are mutually fixed. As the attachment members explained above, for instance, an adhesive member such as touch fasteners, hook-and-loop fasteners, and a soft or a hard fitting member or a coupling member such as a zipper or a zip fastener can be utilized. A material of the support member 30 is preferably a soft material such as a fabric or a nylon, and has a high insulation property.

Further, the electrical stimulator 1 is in a stomach band-like (belly band-like or waist belt) shape as shown in FIG. 7. However, the configuration or the shape of the electrical stimulator 1 is not limited to the above shape. The electrical stimulator 1 can also have various shapes or configurations, such as a hat-like shape for a head or an armband-like shape for an arm or a leg. Specifically, with respect to the hat-like shape and the armband-like shape, the annular member 20 is respectively inserted into or attached on the hat and the armband.

In FIG. 7, the annular member 20 is formed by spiraling or looping the base wire 10 one turn. However, it is preferred that if a member or tool that can electrically connect between disconnected ends of the base wire 10 is provided around the opening and closing edges thereof, the base wire 10 is wound two or more turns around the support member 30 so that a plurality of spirals of base wire 10 are arranged in parallel to each other on the support member 30 and the disconnected ends of the base wire 10 are connected to each other by utilizing the member or tool. As a result, the disconnected ends of the base wire 10 can be electrically connected so that the plurality of spirals of the base wire 10 become a continuous single line (helix).

With respect to the annular member 20 of the electrical stimulator 1, the electric field is only generated inside the hollow part. Therefore, even if an embedded electronic device, such as a pacemaker for a heart, exists in the torso 6 that is surrounded by the annular member 20, there is a low possibility that an electromagnetic interference (EMI) will occur against the embedded electronic device due to this electrical stimulator 1.

Second Embodiment

Next, a second embodiment of the present invention will be explained below.

The base wire 10 that is utilized for the second embodiment is the same as the base wire 10 for the first embodiment. However, the second embodiment is different from the first embodiment with respect to a feature in which an electrical stimulator 2 does not have the support member 30.

In the present embodiment, an insulation treatment is applied around an outer periphery of the base wire 10, and at the same time, the ends "p3" and "p4" also have electronic connection terminal members, for instance, plugs or connectors. On the other hand, the power supply device that has the external circuit 8 has connection members that can be electrically connected to these electronic connection terminal members, and at the same time, can be adequately insulated from the connected portions therebetween.

In order to attach the electrical stimulator 2, first of all, the base wire 10 that has the electronic connection terminal members is wound around the affected part of the patient a few turns. Thereafter, the electronic connection terminal members are electrically connected to the connection members of the external circuit 8.

As a result, because the support member 30 is not necessary, the configuration is further simplified. Further, because the method of attachment of the electrical stimulator 2 can also be adopted to various human body parts, the versatility is further enhanced.

The electrical stimulator being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims. Further, the above embodiments can be combined with each other and such combinations are not to be regarded as a departure from the spirit and scope of the invention.

What is claimed is:

1. An electrical stimulator comprising:
   a base wire configured with:
      a core wire configured with a first conductive wire and a first insulating film that coats the first conductive wire; and
      an outer winding wire wound around a circumference of the core wire with the core wire serving as a winding axis so as to form a plurality of helices, the outer winding wire being configured with a second conductive wire and a second insulating film that coats the second conductive wire;
   an external circuit having a controller, a power supply, a first terminal, and a second terminal;
   an annulus that is formed by the base wire; and
   a support supporting the annulus,
   wherein a first end of the core wire is electrically connected to a first end of the outer winding wire,
   a second end of the core wire is connected to the first terminal of the external circuit, and a second end of the outer winding wire is connected to the second terminal of the external circuit,
   the support has mutually fixed attachment members on both edges, and,
   two ends of each of the annulus and the support are respectively detachably connected to each other via the mutually fixed attachment members to form continuous loops,
   a first thickness of the first insulating film is larger than a second thickness of the second insulating film, and
   a shortest distance between an outer surface of the first insulating film and one of the outer surfaces of the second insulating film is smaller than the first thickness of the first insulating film.

2. The electrical stimulator according to claim 1,
   wherein the controller is further configured to control a parameter of the electrical stimulator, and
   the parameter is one of a period of time for flowing the electric current or a frequency of the electric current.

3. The electrical stimulator according to claim 1,
   wherein the annulus further comprises two or more turns of the base wire so that the annulus is a helix in a helical shape.

4. The electrical stimulator according to claim 1,
   wherein the outer winding wire is wound around the core wire without a clearance therebetween, and
   the base wire is wound to form the annulus so that adjacent helices of the base wire are arranged without a gap therebetween.

5. The electrical stimulator according to claim 1,
   wherein at least one of the core wire or the outer winding wire is a litz wire.

6. An electrical stimulator comprising:
   a base wire configured with:
      a core wire configured with a first conductive wire and a first insulating film that coats the first conductive wire; and
      an outer winding wire wound around a circumference of the core wire with the core wire serving as a winding axis so as to form a plurality of helices, the outer winding wire being configured with a second conductive wire and a second insulating film that coats the second conductive wire;
   an external circuit having a controller, a power supply, a first terminal, and a second terminal; and
   a bioelectric current sensor configured to be attached to a living body,
   wherein an annulus is formed by the base wire,
   a first end of the core wire is electrically connected to a first end of the outer winding wire,
   a second end of the core wire is connected to the first terminal of the external circuit, and a second end of the outer winding wire is connected to the second terminal of the external circuit, the controller of the external circuit is configured to:
receive data from the bioelectric current sensor;
determine an amount of an electric current flowing in the base wire based on the received data; and
cause the power supply of the external circuit to supply power to the base wire via the first and second terminals so as to only generate an electric field inside of the annulus along an axial direction of the annulus, wherein the supplied power corresponds to the determined amount of the electric current,
the annulus is configured to apply electrical stimulation to the living body in response to the generated electric field,
outer surfaces of the second insulating film located between two adjacent helices of the plurality of helices directly contact each other at part of the outer winding wire,
a first thickness of the first insulating film is larger than a second thickness of the second insulating film, and
a shortest distance between an outer surface of the first insulating film and one of the outer surfaces of the second insulating film is smaller than the first thickness of the first insulating film.

7. The electrical stimulator according to claim 6,
wherein at least one of the core wire or the outer winding wire is a litz wire.

8. The electrical stimulator according to claim 7, further comprising:
a support supporting the annulus.

9. The electrical stimulator according to claim 8,
wherein the support has mutually fixed attachment members on both edges, and
two ends of each of the annulus and the support are respectively detachably connected to each other via the mutually fixed attachment members to form continuous loops.

10. The electrical stimulator according to claim 7,
wherein the controller is further configured to control a parameter of the electrical stimulator, and
the parameter is one of a period of time for flowing the electric current or a frequency of the electric current.

11. The electrical stimulator according to claim 6,
wherein the annulus further comprises two or more turns of the base wire so that the annulus is a helix in a helical shape.

12. The electrical stimulator according to claim 11,
wherein at least one of the core wire or the outer winding wire is a litz wire.

13. The electrical stimulator according to claim 11,
wherein the outer winding wire is wound around the core wire without a clearance therebetween, and
the base wire is wound to form the annulus so that adjacent helices of the base wire are arranged without a gap therebetween.

14. The electrical stimulator according to claim 13,
wherein at least one of the core wire or the outer winding wire is a litz wire.

15. The electrical stimulator according to claim 6,
wherein the outer winding wire is wound around the core wire without a clearance therebetween, and
the base wire is wound to form the annulus so that adjacent helices of the base wire are arranged without a gap therebetween.

16. The electrical stimulator according to claim 15,
wherein at least one of the core wire or the outer winding wire is a litz wire.

17. The electrical stimulator according to claim 16, further comprising:
a support supporting the annulus.

18. The electrical stimulator according to claim 17,
wherein the support has mutually fixed attachment members on both edges, and
two ends of each of the annulus and the support are respectively detachably connected to each other via the mutually fixed attachment members to form continuous loops.

19. The electrical stimulator according to claim 15, further comprising:
a support supporting the annulus.

20. The electrical stimulator according to claim 19,
wherein the support has mutually fixed attachment members on both edges, and
two ends of each of the annulus and the support are respectively detachably connected to each other via the mutually fixed attachment members to form continuous loops.

21. The electrical stimulator according to claim 15,
wherein the controller is further configured to control a parameter of the electrical stimulator, and
the parameter is one of a period of time for flowing the electric current or a frequency of the electric current.

22. The electrical stimulator according to claim 6, further comprising:
a support supporting the annulus.

23. The electrical stimulator according to claim 6,
wherein the controller is further configured to control a parameter of the electrical stimulator, and
the parameter is one of a period of time for flowing the electric current or a frequency of the electric current.

* * * * *